(12) United States Patent
Stoia et al.

(10) Patent No.: US 10,544,608 B2
(45) Date of Patent: Jan. 28, 2020

(54) GLOVEBOX CONTROLLER SYSTEMS AND METHODS

(71) Applicant: Tesla, Inc., Palo Alto, CA (US)

(72) Inventors: Jonathon Stoia, Santa Clara, CA (US); Veer Nairyani, San Francisco, CA (US); Evan Small, Menlo Park, CA (US); Luke Simonson, Sunnyvale, CA (US)

(73) Assignee: Tesla, Inc., Palo Alto, CA (US)

( * ) Notice: Subject to any disclaimer, the term of this patent is extended or adjusted under 35 U.S.C. 154(b) by 0 days.

(21) Appl. No.: 15/640,323

(22) Filed: Jun. 30, 2017

(65) Prior Publication Data

US 2019/0003215 A1   Jan. 3, 2019

(51) Int. Cl.
| | |
|---|---|
| *E05B 83/30* | (2014.01) |
| *B60R 7/06* | (2006.01) |
| *E05B 81/80* | (2014.01) |
| *E05B 81/56* | (2014.01) |

(52) U.S. Cl.
CPC ............... *E05B 83/30* (2013.01); *B60R 7/06* (2013.01); *E05B 81/56* (2013.01); *E05B 81/80* (2013.01)

(58) Field of Classification Search
CPC .......... E05B 83/30; E05B 81/56; E05B 81/80; E05B 83/28; E60R 7/06; B60R 7/06
See application file for complete search history.

(56) References Cited

U.S. PATENT DOCUMENTS

| | | | |
|---|---|---|---|
| 2005/0023858 A1* | 2/2005 | Bingle | E05B 83/26 296/76 |
| 2006/0050018 A1* | 3/2006 | Hutzel | B60K 35/00 345/60 |
| 2006/0164230 A1* | 7/2006 | DeWind | B60K 35/00 340/461 |
| 2006/0227488 A1* | 10/2006 | Dimig | H01F 7/04 361/143 |
| 2011/0148575 A1* | 6/2011 | Sobecki | E05B 85/103 340/5.64 |
| 2011/0203181 A1* | 8/2011 | Magner | G08C 17/00 49/324 |

(Continued)

*Primary Examiner* — Behrang Badii
*Assistant Examiner* — Daniel L Greene
(74) *Attorney, Agent, or Firm* — Knobbe, Martens, Olson & Bear, LLP

(57) ABSTRACT

Techniques are disclosed for systems and methods to control a vehicle accessory actuator for an actuated vehicle accessory, such as an actuated glovebox in the cockpit of a vehicle. A vehicle accessory control system includes a vehicle accessory actuator and a logic device configured to control operation of the vehicle accessory actuator. The vehicle accessory actuator is configured to unlatch or otherwise control operation of a vehicle accessory. The logic device is configured to receive an unlatch or other control command associated with the vehicle accessory, determine an operating temperature, other environmental condition, or operational status associated with the vehicle, vehicle accessory, or vehicle accessory actuator, and to provide an actuator control signal to the vehicle accessory actuator to unlatch or otherwise control operation of the vehicle accessory, where electrical characteristics of the actuator control signal are based on the determined operating temperature, other environmental condition, or operational status.

22 Claims, 11 Drawing Sheets

(56) References Cited

U.S. PATENT DOCUMENTS

| | | | |
|---|---|---|---|
| 2011/0289123 A1* | 11/2011 | Denison | G07C 9/00571 707/812 |
| 2011/0289124 A1* | 11/2011 | Denison | G07C 9/00571 707/812 |
| 2012/0011367 A1* | 1/2012 | Denison | G07C 9/00571 713/170 |
| 2013/0030566 A1* | 1/2013 | Shavelsky | A61J 7/04 700/244 |
| 2015/0234186 A1* | 8/2015 | Meadows | G02B 27/017 345/8 |
| 2015/0374868 A1* | 12/2015 | Bruce | A61L 2/208 422/3 |
| 2017/0033554 A1* | 2/2017 | Vail | H02H 3/087 |
| 2017/0121068 A1* | 5/2017 | Foshansky | B65D 43/26 |
| 2018/0154867 A1* | 6/2018 | Golduber | G06Q 10/02 |

* cited by examiner

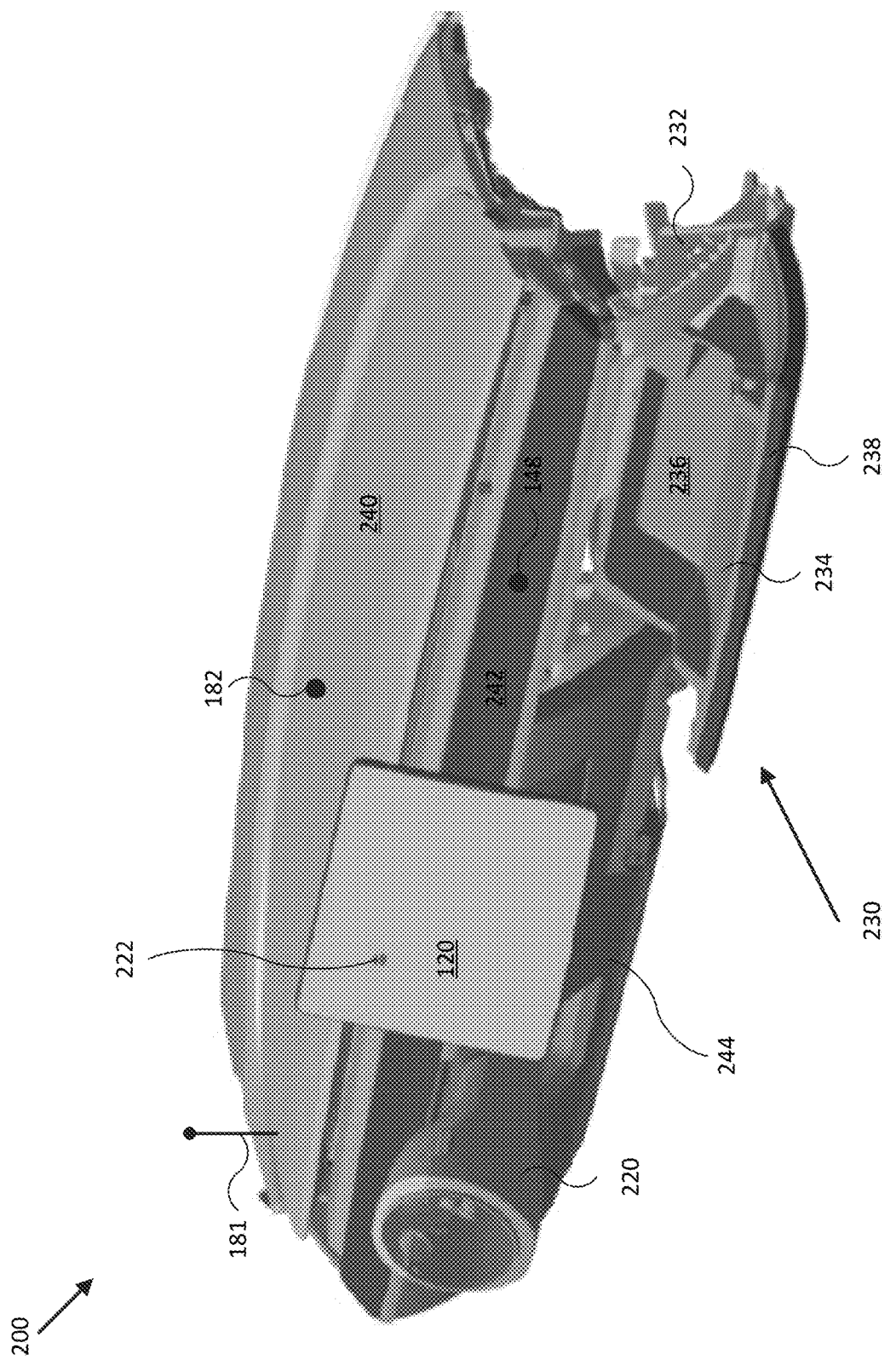

GLOVEBOX CONTROLLER SYSTEMS AND METHODS

TECHNICAL FIELD

One or more embodiments of the invention relate generally to vehicle accessory controllers and more particularly, for example, to systems and methods for controlling vehicle accessory actuators.

BACKGROUND

Vehicles are steadily becoming more automated in order to reduce distractions while driving and to provide other safety features. In particular, many contemporary vehicles include a variety of actuated vehicle accessories, such as actuated door, hood, and trunk latches and/or openers/closers, actuated window rollers, actuated fuel and/or charger door latches, actuated recessable door handles, and/or other actuated vehicle accessories. Operation of such actuated vehicle accessories can be controlled electronically to provide reliable and safe operation and/or storage of the vehicle, such as automatically locking and/or sealing the vehicle when a user parks and exits the vehicle.

Typically, control of such actuated vehicle accessories is accomplished by one or more vehicle accessory actuators, such as various types of electrical actuators that convert actuator control signals into mechanical motion used to operate some aspect of the operation of the vehicle accessory. However, such vehicle accessory actuators are often electrically inefficient and/or noisy, which is particularly undesirable as more vehicles are implemented with electric and/or relatively quiet propulsion systems. Thus, there is a need for an improved methodology to provide efficient and reliable vehicle accessory control, particularly in the context of controlling an electrical vehicle accessory actuator that can be heard by an operator of the vehicle, such as a vehicle accessory within an enclosed vehicle cockpit.

SUMMARY

Techniques are disclosed for systems and methods to control a vehicle accessory actuator for an actuated vehicle accessory, such as an actuated glovebox in the cockpit of a vehicle. A vehicle accessory control system may include one or more vehicle accessory actuators, environmental and/or status sensors, and logic devices configured to communicate with the vehicle accessory actuators and environmental and/or status sensors. Each vehicle accessory actuator may be configured to control operation of a vehicle accessory for a vehicle, such as to unlatch a vehicle accessory, and each environmental and/or status sensor may be configured to monitor an environment and/or status of the vehicle, vehicle accessory, and/or vehicle accessory actuator, such as an operating temperature associated with the vehicle accessory actuator and/or an open status of the vehicle accessory. The logic devices may be configured to receive control commands associated with vehicle accessories, determine environmental conditions and/or statuses associated with corresponding vehicle accessory actuators, and provide actuator control signals to the vehicle accessory actuators to control operation of the vehicle accessory. The logic devices may be configured to generate the actuator control signals such that various electrical characteristics of the actuator control signals are based, at least in part, on the determined environmental conditions and/or statuses associated with corresponding vehicle accessory actuators.

In various embodiments, a vehicle accessory control system may include one or more temperature sensors, electrical sensors, environmental sensors, sound-monitoring subsystems, communication modules, and/or additional sensors, actuators, controllers, user interfaces, and/or other modules mounted to or within a vehicle. Each component of the system may be implemented with a logic device adapted to form one or more wired and/or wireless communication links for transmitting and/or receiving sensor signals, control signals, or other signals and/or data between the various components.

In one embodiment, a vehicle accessory control system may include a vehicle accessory actuator configured to unlatch a vehicle accessory for a vehicle and a logic device coupled within the vehicle and configured to control operation of the vehicle accessory actuator. The logic device may be configured to receive an unlatch command associated with the vehicle accessory, determine an operating temperature associated with the vehicle accessory actuator, and provide an actuator control signal to the vehicle accessory actuator to unlatch the vehicle accessory, where at least one electrical characteristic of the actuator control signal may be based, at least in part, on the determined operating temperature associated with the vehicle accessory actuator.

In another embodiment, a method may include receiving an unlatch command associated with a vehicle accessory for a vehicle, determining an operating temperature associated with a vehicle accessory actuator configured to unlatch the vehicle accessory, and providing an actuator control signal to the vehicle accessory actuator to unlatch the vehicle accessory, wherein at least one electrical characteristic of the actuator control signal is based, at least in part, on the determined operating temperature associated with the vehicle accessory actuator.

The scope of the invention is defined by the claims, which are incorporated into this section by reference. A more complete understanding of embodiments of the invention will be afforded to those skilled in the art, as well as a realization of additional advantages thereof, by a consideration of the following detailed description of one or more embodiments. Reference will be made to the appended sheets of drawings that will first be described briefly.

BRIEF DESCRIPTION OF THE DRAWINGS

FIG. 2A illustrates a diagram of a vehicle cockpit including an actuated vehicle accessory in accordance with an embodiment of the disclosure.

Embodiments of the invention and their advantages are best understood by referring to the detailed description that follows. It should be appreciated that like reference numerals are used to identify like elements illustrated in one or more of the figures.

DETAILED DESCRIPTION

In accordance with various embodiments of the present disclosure, vehicle accessory control may be provided by a vehicle accessory actuator and a logic device configured to generate and provide an actuator control signal to the vehicle accessory actuator to control operation of the vehicle accessory, where at least one electrical characteristic of the actuator control signal is modified based, at least in part, on an environmental condition and/or status associated with the vehicle accessory actuator, so as to operate the vehicle accessory relatively efficiently, reliably, and/or quietly, as compared to conventional vehicle accessory controllers. In particular, embodiments of the present vehicle accessory control system may be employed to unlatch an actuated glovebox disposed within a cockpit of a vehicle relatively efficiently, reliably, and/or quietly. Such vehicle accessory control systems may be implemented with various types of control feedback mechanisms, including status and/or sound measurement feedback mechanisms, to ensure reliable and quiet operation. Moreover, such vehicle accessory control systems may be implemented with various types of user feedback mechanisms to report potentially unsafe conditions and/or undesired operation of the vehicle accessory, as described herein.

Figure 1A:
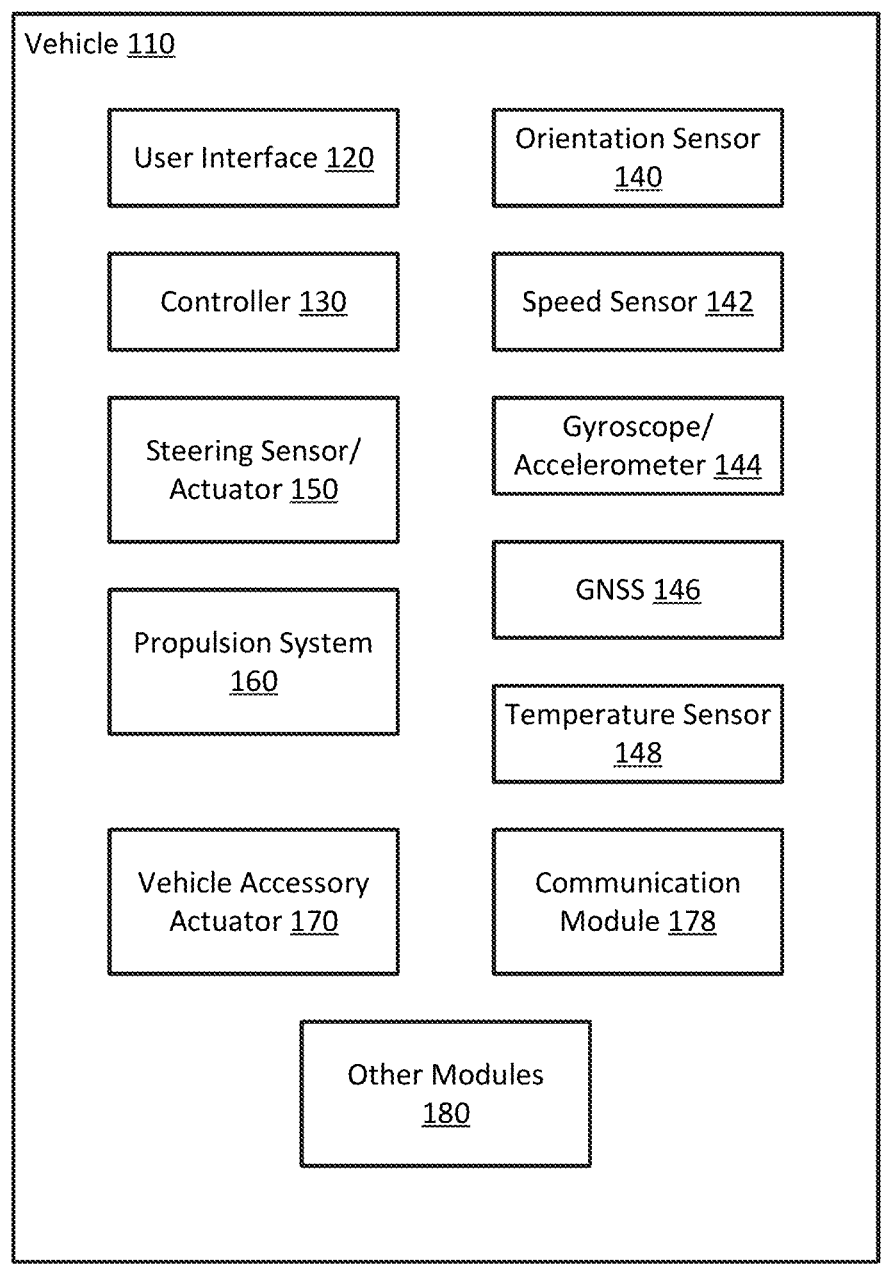
FIG. 1A illustrates a block diagram of a vehicle accessory control system in accordance with an embodiment of the disclosure.

FIG. 1A illustrates a block diagram of a vehicle accessory control system 100 in accordance with an embodiment of the disclosure. In various embodiments, system 100 may be adapted to measure an orientation, a position, an acceleration, a speed, a temperature, and/or other environmental condition and/or status of vehicle 110 and/or one or more elements of system MO. System 100 may then use these measurements to control operation of vehicle 110, vehicle accessory actuator 170, and/or one or more other elements of system 100.

In the embodiment shown in FIG. 1A, system 100 may be implemented to provide control for a particular type of vehicle accessory associated with vehicle accessory actuator 170, such as an actuated door, hood, or trunk latch and/or opener/closer, window roller, fuel and/or charger door latch, recessable door handle, glovebox, and/or other actuated vehicle accessories. In one embodiment, system 100 may include one or more of a user interface 120, a controller 130, an orientation sensor 140, a speed sensor 142, a gyroscope/accelerometer 144, a global navigation satellite system (GNSS) 146, a temperature sensor 148, a steering sensor/actuator 150, a propulsion system 160, a vehicle accessory actuator 170, a communication module 178, and/or one or more other sensors and/or actuators, such as other modules 180. In some embodiments, one or more of the elements of system 100 may be implemented in a combined housing or structure that can be coupled to vehicle 110 and/or held or carried by a user of vehicle 110. In general, vehicle 110 may be a terrestrial, waterborne, and/or airborne vehicle, including a car, truck, locomotive, ship, and/or airplane.

User interface 120 may be implemented as a display, a touch screen, a keyboard, a mouse, a joystick, a knob, a steeling wheel, a ship's wheel or helm, a yoke, and/or any other device capable of accepting user input and/or providing feedback to a user. In various embodiments, user interface 120 may be adapted to provide user input (e.g., as a type of signal and/or sensor information) to other devices of system 100, such as controller 130. User interface 120 may also be implemented with one or more logic devices that may be adapted to execute instructions, such as software instructions, implementing any of the various processes and/or methods described herein. For example, user interface 120 may be adapted to form communication links, transmit and/or receive communications (e.g., sensor signals, control signals, sensor information, user input, and/or other information), or to perform various other processes and/or methods.

In various embodiments, user interface 120 may be adapted to render a control selector on a touchscreen display of user interface 120, to accept user input (e.g., user selection of the rendered control selector to control operation of vehicle accessory actuator 170), to form a communication link, to select a particular wireless networking protocol and/or parameters for a particular wireless networking protocol and/or wireless link (e.g., a password, an encryption key, a MAC address, a device identification number, a device operation profile, parameters for operation of a device, and/or other parameters), to select a method of processing sensor signals to determine sensor information, and/or to otherwise facilitate operation of system 100 and devices within system 100. Once user interface 120 accepts a user input, the user input may be transmitted to other devices of system 100 over one or more communication links.

In one embodiment, user interface 120 may be adapted to receive a sensor or control signal (e.g., from orientation sensor 140 and/or steering sensor/actuator 150) over communication links formed by one or more associated logic devices, for example, and display sensor and/or other information corresponding to the received sensor or control signal to a user. In related embodiments, user interface 120 may be adapted to process sensor and/or control signals to determine sensor and/or other information. For example, a sensor signal may include an orientation, an angular velocity, an acceleration, a speed, and/or a position of vehicle 110. In such embodiments, user interface 120 may be adapted to process the sensor signals to determine sensor information indicating an estimated and/or absolute roll, pitch, and/or yaw (attitude and/or rate), and/or a position or series of positions of vehicle 110, for example, and display the sensor information as feedback to a user. In one embodiment, user interface 120 may be adapted to display a time series of various sensor information and/or other parameters as part of or overlaid on a graph or map, which may be referenced to a position and/or orientation of vehicle 110, For example, user interface 120 may be adapted to display a time series of positions, headings, and/or orientations of vehicle 110 and/or other elements of system 100 overlaid on a geographical map, which may include one or more graphs indicating a corresponding time series of actuator control signals, sensor information, and/or other sensor and/or control signals.

More generally, user interface 120 may be adapted to display sensor information to a user, for example, and/or to transmit sensor information and/or user input to other user interfaces, sensors, modules, or controllers of system 100, for instance, for display, communication, and/or further processing. In one embodiment, user interface 120 may be integrated with one or more sensors (e.g., imaging modules, position and/or orientation sensors, other sensors) and/or be portable (e.g., such as a portable touch screen display or smart phone, for example, or a wearable user interface) to facilitate user interaction with various systems of vehicle 110.

Controller 130 may be implemented as any appropriate logic device (e.g., processing device, microcontroller, processor, application specific integrated circuit (ASIC), field programmable gate array (FPGA), memory storage device, memory reader, or other device or combinations of devices) that may be adapted to execute, store, and/or receive appropriate instructions, such as software instructions implementing a control loop for controlling various operations of vehicle 110, vehicle accessory actuator 170, and/or other elements of system 100, for example. Such software instructions may also implement methods for processing sensor signals, determining sensor information, providing user feedback (e.g., through user interface 120), querying devices for operational parameters, selecting operational parameters for devices, or performing any of the various operations described herein (e.g., operations performed by logic devices of various devices of system 100).

In addition, a machine readable medium may be provided for storing non-transitory instructions for loading into and execution by controller 130. In these and other embodiments, controller 130 may be implemented with other components where appropriate, such as volatile memory, non-volatile memory, one or more interfaces, and/or various analog and/or digital components for interfacing with devices of system 100. For example, controller 130 may be adapted to store sensor signals, sensor information, calibration parameters, sets of calibration points, and/or other operational parameters, over time, for example, and provide such stored data to a user using user interface 120. In some embodiments, controller 130 may be integrated with one or more user interfaces user interface 120), and, in one embodiment, may share a communication module or modules. As noted herein, controller 130 may be adapted to execute one or more control loops for steering control (e.g., using steering sensor/actuator 150) and/or performing other various operations of vehicle 110 and/or system 100. In some embodiments, a control loop may include processing sensor signals and/or sensor information in order to control one or more operations of vehicle 110, vehicle accessory actuator 170, and/or other elements of system 100.

Orientation sensor 140 may be implemented as one or more of a compass, float, accelerometer, and/or other digital or analog device capable of measuring an orientation of vehicle 110 and/or one or more other elements of system 100 (e.g., magnitude and direction of roll, pitch, and/or yaw, relative to one or more reference orientations such as gravity and/or Magnetic North) and providing such measurements as sensor signals that may be communicated to various devices of system 100. In some embodiments, orientation sensor 140 may be adapted to provide heading measurements for vehicle 110. In other embodiments, orientation sensor 140 may be adapted to provide roll, pitch, and/or yaw rates for vehicle 110 (e.g., using a time series of orientation measurements). Orientation sensor 140 may be positioned and/or adapted to make orientation measurements in relation to a particular coordinate frame of vehicle 110, for example.

Speed sensor 142 may be implemented as an electronic pitot tube, metered gear or wheel, water speed sensor, wind speed sensor, a wind velocity sensor (e.g., direction and magnitude) and/or other device capable of measuring or determining a linear speed of vehicle 110 (e.g., in a surrounding medium and/or aligned with a longitudinal axis of vehicle 110) and providing such measurements as sensor signals that may be communicated to various devices of system 100. In some embodiments, speed sensor 142 may be adapted to provide a velocity of a surrounding medium relative to sensor 142 and/or vehicle 110.

Gyroscope/accelerometer 144 may be implemented as one or more electronic sextants, semiconductor devices, integrated chips, accelerometer sensors, accelerometer sensor systems, or other devices capable of measuring angular velocities/accelerations and/or linear accelerations (e.g., direction and magnitude) of vehicle 110 and/or other elements of system 100 and providing such measurements as sensor signals that may be communicated to other devices of system 100 (e.g., user interface 120, controller 130). Gyroscope/accelerometer 144 may be positioned and/or adapted to make such measurements in relation to a particular coordinate frame of vehicle 110, for example. In various embodiments, gyroscope/accelerometer 144 may be implemented in a common housing and/or module with other elements of system 100 to ensure a common reference frame or a known transformation between reference frames.

GNSS 146 may be implemented as a global positioning satellite receiver and/or other device capable of determining absolute and/or relative positions of vehicle 110 (e.g., or another element of system 100) based on wireless signals received from space-born and/or terrestrial sources, for example, and capable of providing such measurements as sensor signals that may be communicated to various devices of system 100. In some embodiments, GNSS 146 may be adapted to determine a velocity, speed, and/or yaw rate of vehicle 110 (e.g., using a time series of position measurements), such as an absolute velocity and/or a yaw component of an angular velocity of vehicle 110. In various embodiments, one or more logic devices of system 100 may be adapted to determine a calculated speed of vehicle 110 and/or a computed yaw component of the angular velocity from such sensor information.

Temperature sensor 148 may be implemented as a thermistor, electrical sensor, electrical thermometer, and/or other device capable of measuring temperatures associated with vehicle 110, vehicle accessory actuator 170, and/or one or more other elements of system 100, for example, and providing such measurements as sensor signals that may be communicated to various elements of system 100, including controller 130. In some embodiments, temperature sensor 148 may be configured to measure an operating temperature of vehicle accessory actuator 170 and/or other elements of system 100 directly, such as being thermally and/or physically coupled to or near vehicle accessory actuator 170. In other embodiments, temperature sensor 148 may be configured to measure an environmental temperature associated with vehicle 110, such as a cockpit or dash temperature, for example, that may be used to estimate a temperature of one or more elements of system 100, including vehicle accessory actuator 170. In one embodiment, temperature sensor 148 may be implemented by an electrical sensor coupled to power leads for vehicle accessory actuator 170 and configured to measure a resistance and/or current draw of vehicle accessory actuator 170, for example, to determine an operating temperature of vehicle accessory actuator 170.

Steering sensor/actuator 150 may be adapted to physically adjust a heading of vehicle 110 according to one or more control signals and/or user inputs provided by a logic device of system 100, such as controller 130. Steering sensor/actuator 150 may include one or more actuators and control surfaces (e.g., a rudder or other type of steering or trim mechanism) of vehicle 110, and may be adapted to physically adjust the control surfaces to a variety of positive and/or negative steering angles/positions. Steering sensor/actuator 150 may also be adapted to sense a current steering angle/position of such steering mechanism and provide such measurement to controller 130, for example, to facilitate feedback autopilot control of vehicle 110, for instance, or to adjust operation of other elements of system 100.

Propulsion system 160 may be implemented as a propeller, turbine, or other thrust-based propulsion system, a mechanical wheeled and/or tracked propulsion system, a sail-based propulsion system, and/or other types of propulsion systems that can be used to provide motive force to vehicle 110. In some embodiments, propulsion system 160 may include non-articulated elements, for example, such that the direction of motive force and/or thrust generated by such elements is fixed relative to a coordinate frame of vehicle 110. Non-limiting examples of non-articulated propulsion elements include, for example, a fixed drive train for a terrestrial vehicle, an inboard motor for a watercraft with a fixed thrust vector, or a fixed aircraft propeller or turbine. In other embodiments, propulsion system 160 may include articulated elements and may be coupled to and/or integrated with steering sensor/actuator 150, for example, such that the direction of generated motive force and/or thrust is variable relative to a coordinate frame of vehicle 110. Non-limiting examples of articulated propulsion elements include, for example, a steerable drive train for a terrestrial vehicle, an outboard motor for a watercraft, an inboard motor for a watercraft with a variable thrust vector/port (e.g., used to steer the watercraft), a sail, or an aircraft propeller or turbine with a variable thrust vector, for example.

Vehicle accessory actuator 170 may be implemented as an electrical actuator and/or other device configured to convert actuator control signals into mechanical motion. For example, vehicle accessory actuator 170 may be implemented by a solenoid actuator configured to convert actuator control signals into linear motion of a solenoid armature, plunger, or hub. In other embodiments, vehicle accessory actuator 170 may be implemented by an electrical motor configured to convert actuator control signals into rotational motion of a motor armature. Whether linear or rotational motion, such armature motion may be used, typically with various types of mechanical linkages, to actuate a particular type of vehicle accessory. For example, linear armature motion may be used to unlatch an actuated glovebox, door, or other locked enclosure associated with vehicle 110, and rotary armature motion may be used to roll an actuated window up or down, to extend a retractable antenna, to expose or retract recessable door handles.

In some embodiments, vehicle accessory actuator 170 may be configured to provide a vehicle accessory status of the vehicle accessory actuated by vehicle accessory actuator 170. For example, such vehicle accessory status may include an open, closed, or indeterminate status corresponding to an open state of the vehicle accessory. In such embodiments, a physical or electrical state of vehicle accessory actuator 170 may correspond to a particular vehicle accessory status; for example, each of the open, closed, or indeterminate statuses may correspond to a particular travel position of an armature of vehicle accessory actuator 170 (e.g., selected by a particular latching and/or linkage mechanism, as described herein), for example, which in some embodiments may be sensed by an armature travel position sensor integrated with vehicle accessory actuator 170, and in other embodiments may be sensed by measuring one or more electrical properties of vehicle accessory actuator 170 (e.g., an impedance and/or other electrical characteristic of vehicle accessory actuator 170). In additional embodiments, vehicle accessory actuator 170 may be implemented with an adjustable voltage source configured to adjust a supply voltage provided to vehicle accessory actuator 170 (e.g., controlled by controller 130). Vehicle accessory actuator 170 may alternatively or additionally be implemented with an adjustable current source configured to adjust a supply current provided to vehicle accessory actuator 170, and/or an adjustable power source configured to adjust a supply power provided to vehicle accessory actuator 170. Such adjustable circuit elements may alternatively be disposed at a power supply for vehicle accessory actuator 170, such as opposite a wire harness for vehicle accessory actuator 170, as described herein.

Although FIG. 1A shows various sensors and/or other components of system 100 separate from vehicle accessory actuator 170, in other embodiments, any one or combination of sensors and components of system 100 may be integrated with vehicle accessory actuator 170. For example, temperature sensor 148 may be integrated with vehicle accessory actuator 170 and be configured to provide direct measurements of a temperature of vehicle accessory actuator 170 and/or an associated accessory.

Figure 1B:
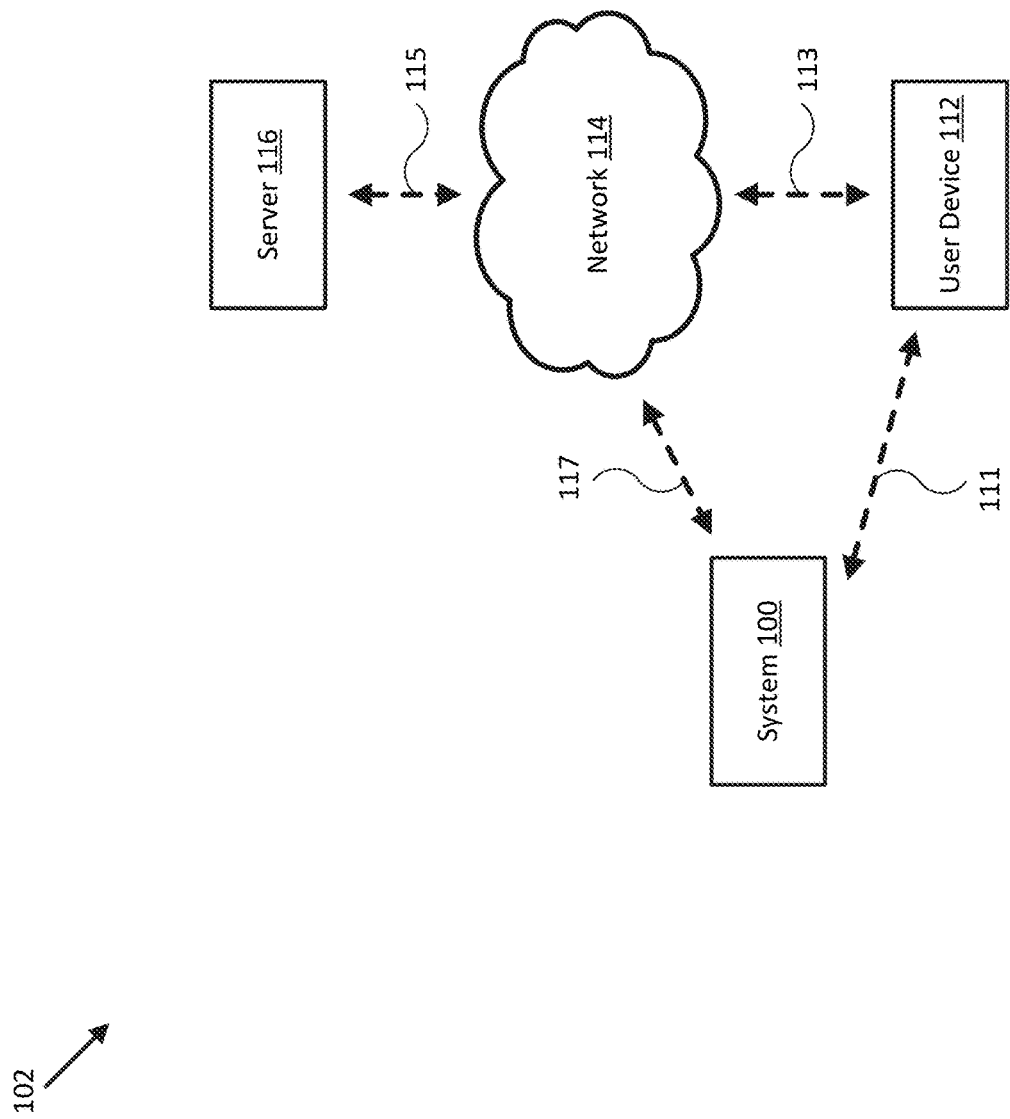
FIG. 1B illustrates a diagram of a vehicle accessory control system in accordance with an embodiment of the disclosure.

Communication module 178 may be implemented as any wired and/or wireless interface configured to communication sensor data, configuration data, parameters, and/or other data and/or signals between elements of vehicle 110, for example, and/or wirelessly to remote user devices and/or servers, as shown in more detail in FIG. 1B. As described herein, in some embodiments, communication module 178 may be implemented in a distributed manner such that portions of communication module 178 are implemented within one or more elements of system 100.

Other modules 180 may include other and/or additional sensors, sensor arrays, actuators, logic devices, communications modules/nodes, power and/or power distribution components, and/or user interface devices used to measure and/or provide additional environmental condition and/or status information related to vehicle 110 and/or other elements of system 100, for example. In some embodiments, other modules 180 may include a humidity sensor, a barometer a pressure sensor, a position sensor, an alarm, a radar system, a camera, and/or other environmental sensors providing measurements and/or other sensor signals that can be displayed to a user and/or used by other elements of system 100 (e.g., controller 130) to provide operational control of vehicle 110 and/or system 100 that compensates for environmental conditions. In some embodiments, other modules 180 may include a sound-monitoring subsystem configured to monitor spoken commands and/or other sounds within a cockpit of the vehicle, including sounds associated with actuation of vehicle accessory actuator 170, and provide the spoken commands and/or sounds to controller 130. In additional embodiments, other modules 180 may include a vehicle accessory status sensor configured to monitor a vehicle accessory status of the vehicle accessory actuated by vehicle accessory actuator 170. For example, such vehicle accessory status may include an open, closed, or indeterminate status corresponding to an open state of the vehicle accessory.

In general, each of the elements of system 100 may be implemented with any appropriate logic device (e.g., processing device, microcontroller, processor, application specific integrated circuit (ASIC), field programmable gate array (FPGA), memory storage device, memory reader, or other device or combinations of devices) that may be adapted to execute, store, and/or receive appropriate instructions, such as software instructions implementing a method for controlling operation of vehicle accessory actuator 170, for example, or for transmitting and/or receiving communications, such as sensor signals, sensor information, and/or control signals, between one or more devices of system 100. In one embodiment, such method may include instructions for forming one or more communication links between various devices of system 100 and/or one or more remote user devices and/or servers. In addition, one or more machine readable mediums may be provided for storing non-transitory instructions for loading into and execution by any logic device implemented with one or more of the devices of system 100. In these and other embodiments, the logic devices may be implemented with other components where appropriate, such as volatile memory, non-volatile memory, and/or one or more interfaces (e.g., inter-integrated circuit (I2C) interfaces, mobile industry processor interfaces (MIPI), joint test action group (JTAG) interfaces (e.g., IEEE 1149.1 standard test access port and boundary-scan architecture), and/or other interfaces, such as an interface for one or more antennas, or an interface for a particular type of sensor).

Each of the elements of system 100 may be implemented with one or more amplifiers, modulators, phase adjusters, beamforming components, digital to analog converters (DACs), analog to digital converters (ADCs), various interfaces, antennas, transducers, and/or other analog and/or digital components enabling each of the devices of system 100 to transmit and/or receive signals, for example, in order to facilitate wired and/or wireless communications between one or more devices of system 100. Such components may be integrated with a corresponding element of system 100, for example. In some embodiments, the same or similar components may be used to perform one or more sensor measurements, as described herein. Sensor signals, control signals, and other signals may be communicated among elements of system 100 using a variety of wired and/or wireless communication techniques, including voltage signaling, Ethernet, WiFi, Bluetooth, Zigbee, Xbee, Micronet, CAN bus, or other medium and/or short range wired and/or wireless networking protocols and/or implementations, for example. In such embodiments, each element of system 100 may include one or more modules supporting wired, wireless, and/or a combination of wired and wireless communication techniques.

FIG. 1B illustrates a diagram of a vehicle accessory control and reporting system 102 in accordance with an embodiment of the disclosure. As can be seen in FIG. 1B, system 102 may include system 100 of FIG. 1A configured to communicate with a user device 112 and/or a server 116 over one or more of communication links 113, 115, and 117 and network 114 and/or optional direct communication link 111. In various embodiments, communication links 111, 113, 115, and 117, and network 114, may include one or more wired and/or wireless network interfaces, protocols, topologies, and/or methodologies, as described herein.

In typical operation, system 100 may be configured to provide information relating to operation and/or status of vehicle 110 and/or a vehicle accessory of system 100/vehicle 110 to user device 112 and/or server 116, for example, and/or to receive control commands associated with a vehicle accessory of system 100/vehicle 110 from user device 112 and/or server 116. For example, controller 130 of system 100 may be configured to use communication module 178 to establish communication link 117 to network 114 (e.g., a wide area network, such as a cellular network and/or the Internet) to communicate with server 116 over communication link 115 and/or with user device 112 over communication link 113, for example, and to receive a control command, such as an unlatch command, associated with a vehicle accessory actuated by vehicle accessory actuator 170. In other embodiments, controller 130 of system 100 may be configured to use communication module 178 to establish communication link 111 directly to user device 112 (e.g., a local area network, such as a Bluetooth or Wifi network) and to receive a control command for vehicle accessory actuator 170 directly from user device 112.

Alternatively, controller 130 and communication module 178 may be configured to use either communication mechanism to report an operating temperature, a measured resistance and/or current draw, other environmental data, a vehicle accessory status, and/or other operating characteristics associated with vehicle accessory actuator 170 to user device 112 and/or server 116. In particular, controller 130 may be configured to detect an indeterminate or open status of a vehicle accessory when the desired or expected status is a closed status and to report the open status to user device 112 and/or server 116. Such report may indicate a failed closing of the vehicle accessory, for example, or an attempted theft of contents within an enclosure secured by the vehicle accessory/vehicle accessory actuator 170. In various embodiments, communications between elements of system 102 may be time stamped to differentiate old and updated commands, statuses, and/or associated environmental conditions.

User device 112 may be implemented as a logic device, a tablet computer, a laptop, a smartphone, a desktop, and/or a server computer that may be configured to provide a control command (e.g., an unlatch command) to system 100 and/or receive statuses and/or associated environmental conditions reported by system 100. In some embodiments, user device 112 may be configured to render an unlatch selector and/or other control selector on a display of user device 112, receive user selection of the unlatch or control selector, and provide a corresponding unlatch or control command to system 100.

Server 116 may be implemented as a logic device, a tablet computer, laptop, desktop, and/or server computer that may be configured to provide a control command (e.g., an unlatch command) to system 100 and/or receive statuses and/or associated environmental conditions reported by system 100. In some embodiments, server 116 may act to convey such commands, statuses, and/or other data between system 100 and user device 112. In other embodiments, server 116 may initiate various control commands. For example, a user may accidentally lock user device 112 in vehicle 110 and/or in a vehicle accessory of vehicle 110. The user may call a service provider operating server 116 (e.g., using a different user device 112) to request the service provider unlock vehicle 110 and/or unlatch a vehicle accessory of vehicle 110, and the service provider may use server 116 to do so.

Communication link 111 may typically be implemented using one or more or wireless network interfaces, protocols, topologies, and/or methodologies configured for local area networking, such as according to a Bluetooth or WiFi communication link. Communication link 117 may typically be implemented using one or more or wireless network interfaces, protocols, topologies, and/or methodologies configured for wide area networking, such as according to a WiFi or cellular communication link. Communication links 113 and/or 115 may typically be implemented using one or more wired and/or wireless network interfaces, protocols, topologies, and/or methodologies configured to interface with a wide area network. Network 114 may typically be implemented by a wide area network, such as a cellular network and/or the Internet. Although network 114 is shown as one element in FIG. 1B, in various embodiments, network 114 may include multiple network infrastructures and/or combinations of infrastructures where, for example, each of system 100/vehicle 110 and/or user device 112 may be configured to use substantially different network infrastructures to access server 116.

FIG. 2A illustrates a diagram of a vehicle cockpit 200 including an actuated vehicle accessory (e.g., a glovebox assembly 230) in accordance with an embodiment of the disclosure. As shown in FIG. 2A, vehicle cockpit 200 includes a steering column 220 (e.g., steering sensor/actuator 150), user interface 120 (e.g., a touchscreen display) rendering a control selector 222 (e.g., an unlatch selector) for user selection, an upper dashboard 240, a transition dashboard 242, and a lower dashboard 244 approximately encompassing glovebox assembly 230. Vehicle accessory/glovebox assembly 230 (e.g., also referred to as glovebox 230) includes glovebox support frame 232, which is secured to vehicle 110 partially through upper dashboard 240, transition dashboard 242, and lower dashboard 244, a glovebox enclosure 234 encompassing a glovebox interior 236, and a glovebox facie 238, which is used to match a desired interior design of cockpit 200 and/or to protect and seal glovebox enclosure 234 when glovebox assembly 230 is closed. Also shown in FIG. 2A are temperature sensor 148 configured to measure a temperature of vehicle 110 and/or cockpit 200, which may be used to determine or estimate an operating temperature of glovebox assembly 230, and wireless interface 181 and microphone 182 (e.g., elements of other modules 180). Wireless interface/antenna 181 may be coupled to communication module 178 to facilitate wireless communications (e.g., with network user device 112, network, 114, and/or server 116 of FIG. 1B), and microphone 182 may be coupled to a sound-monitoring subsystem (e.g., an element of other modules 180) configured to monitor spoken commands and/or other sounds within cockpit 200 and provide such sounds to controller 130 for further processing, as described herein.

Figure 2B:
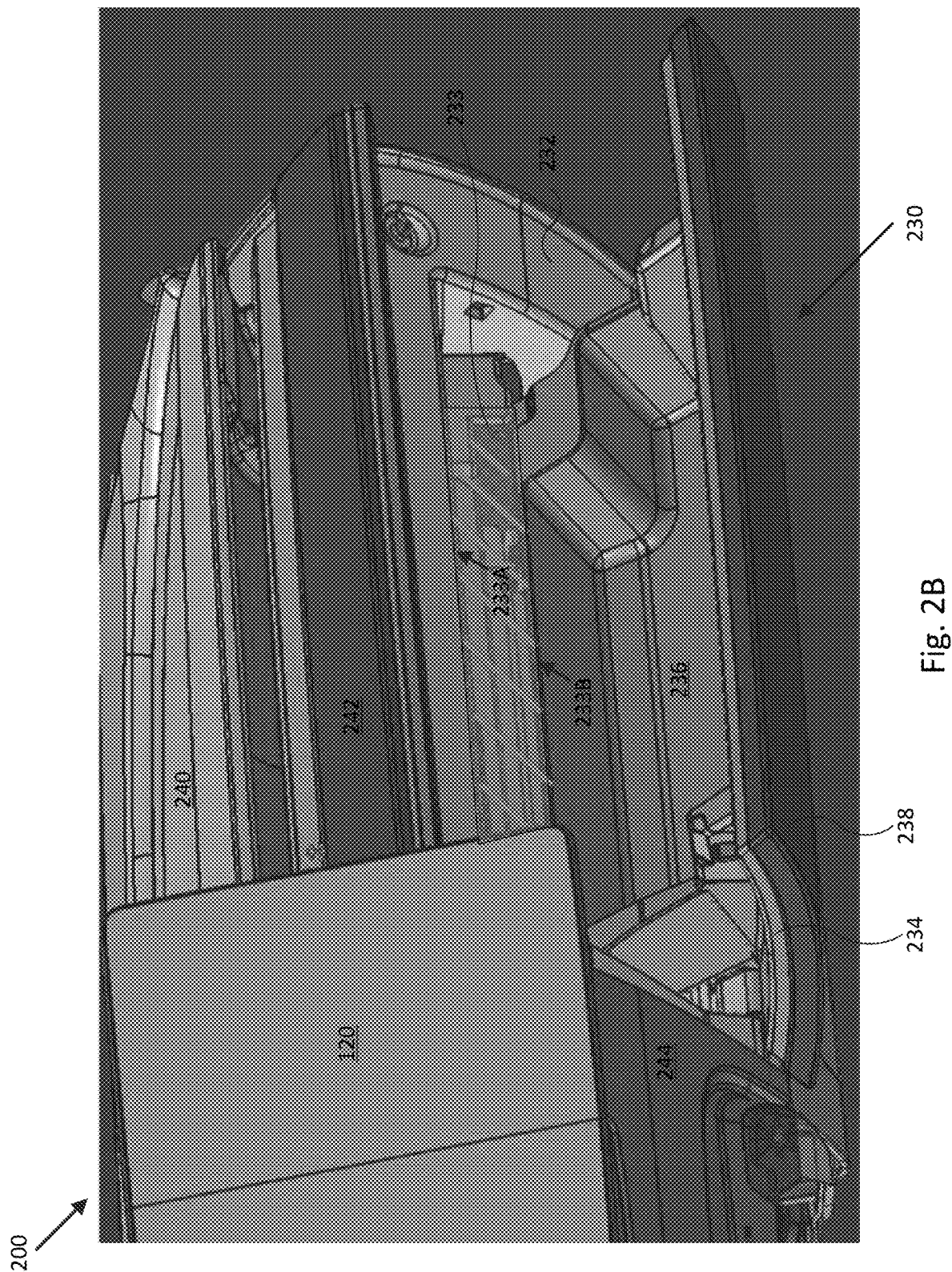
FIG. 2B illustrates a diagram of a vehicle cockpit including an actuated vehicle accessory in accordance with an embodiment of the disclosure.

FIG. 2B illustrates a diagram of vehicle cockpit 200 including actuated vehicle accessory 230 in accordance with an embodiment of the disclosure, from a different view perspective. In addition to the elements described with reference to FIG. 2A, the perspective provided by FIG. 2B shows a hinged interior cover 233 of glovebox assembly 230. Interior cover 233 may be coupled within glovebox support frame 232 substantially along an upper edge 233A and is shown in FIG. 2B in a glovebox-open position, where interior cover 233 hangs down by its own weight into glovebox interior 236 to effectively seal glovebox interior 236 and prevent objects within glovebox interior 236 front passing through glovebox support frame 232 into areas behind and/or otherwise enclosed by upper dashboard 240, transition dashboard 242, lower dashboard 244, and glovebox support frame 232. Interior cover 233 may be coupled to glovebox support frame 232 using one or more living hinges, for example, or may be coupled to or within glovebox support frame 232 and/or other structures within upper dashboard 240, transition dashboard 242, and lower dashboard 244 using corner hinges and/or or more barrel hinges or similar type hinges. When glovebox assembly 230 is closed, lower edge 233B of interior cover 233 rotates into the space behind glovebox support frame 232 and away from glovebox interior 236 to allow glovebox assembly 230 to close and seal glovebox interior 236.

Figure 3:
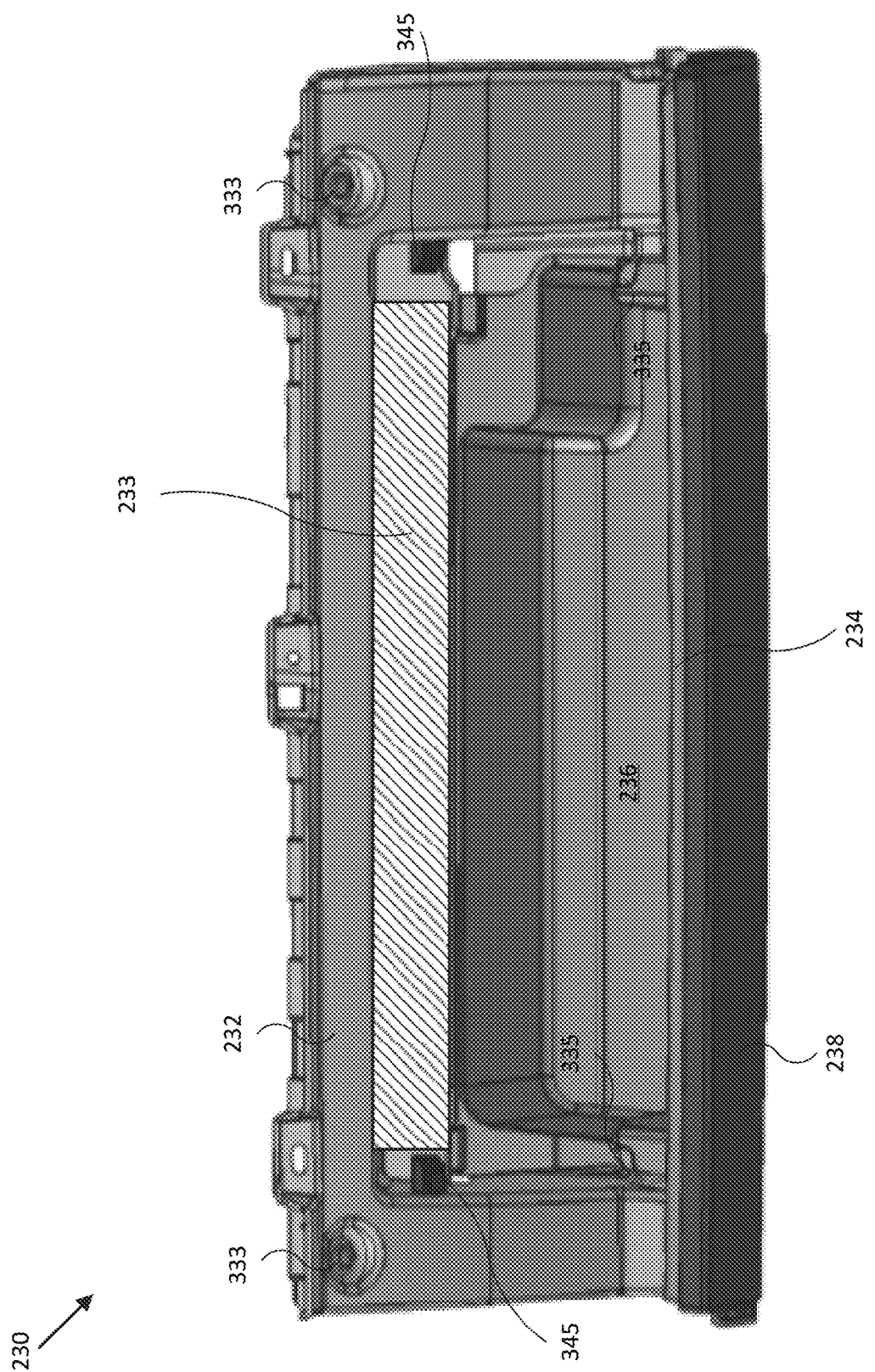
FIG. 3 illustrates a diagram of an actuated vehicle accessory in accordance with an embodiment of the disclosure.

FIG. 3 illustrates a diagram of actuated vehicle accessory/glovebox assembly 230 in accordance with an embodiment of the disclosure. In addition to the elements described with reference to FIGS. 2A-B, FIG. 3 shows frame stops 333, latch bolts 345, and strike plates 335. Frame stops 333 may be formed from flexible material configured to cushion closing of glovebox assembly 230 by flexibly contacting glovebox enclosure 234, which acts to protect glovebox assembly 230 from damage when closing and to reduce the sound level of sounds caused by such closing. In some embodiments, one or more of frame stops 333 may be implemented with pressure sensors (e.g., other modules 180) configured to detect a closed state of glovebox assembly 230 and/or to differentiate a closed state from an intermediate and/or open state of glovebox assembly 230. Latch bolts 345 are actuated by a corresponding glovebox actuator (shown as glovebox actuator 440 in FIG. 4) and are configured to interface with strike plates 335 to lock or latch glovebox assembly 230 in a closed position. Strike plates 335 are integrated with glovebox enclosure 335 so as to be hidden from view and access when glovebox assembly 230 is closed.

Figure 4:
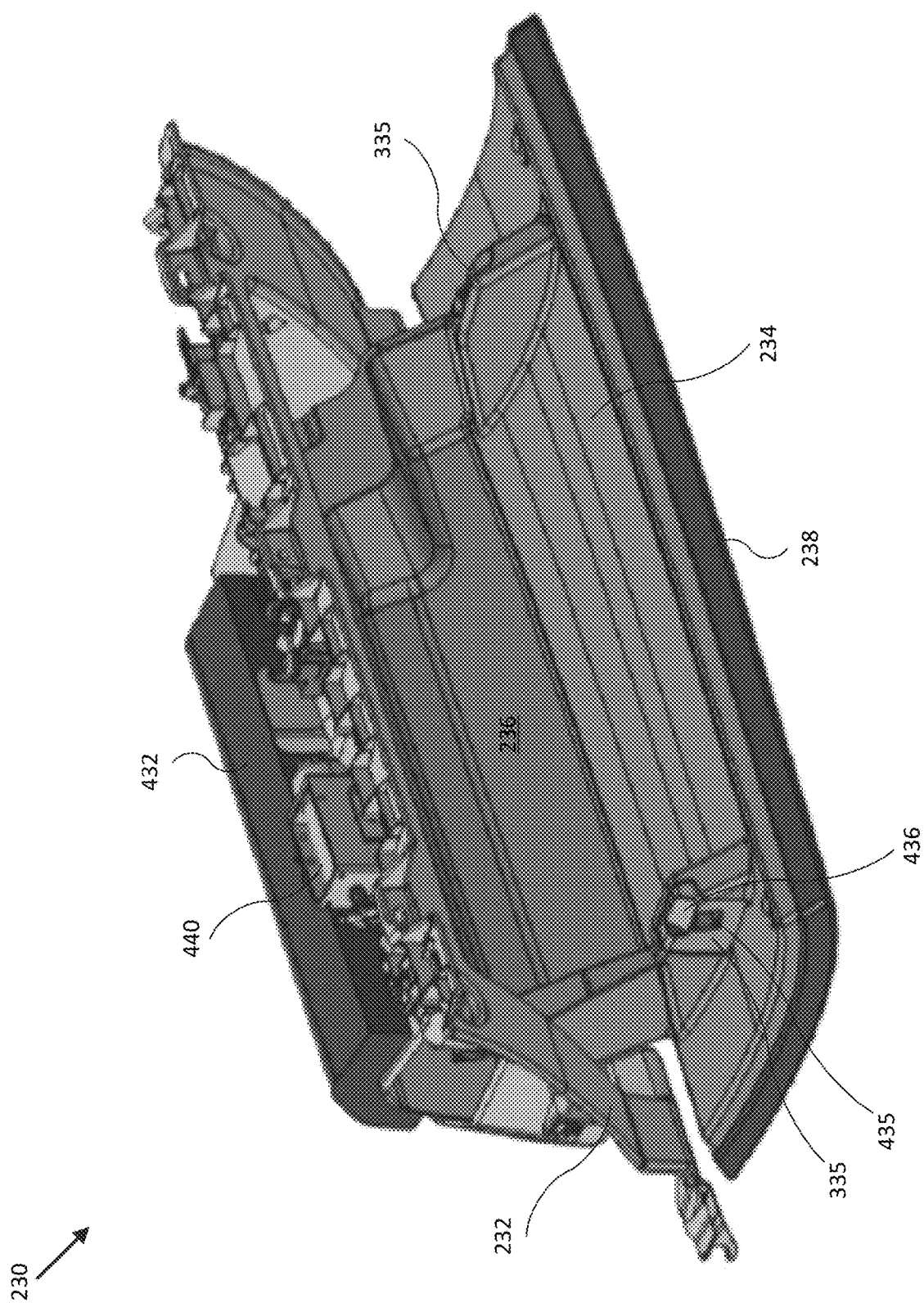
FIG. 4 illustrates a diagram of an actuated vehicle accessory in accordance with an embodiment of the disclosure.

FIG. 4 illustrates a diagram of actuated vehicle accessory/glovebox assembly 230 in accordance with an embodiment of the disclosure. In addition to the elements described with reference to FIGS. 2A-3, FIG. 4 shows a glovebox actuator 440, a frame cover 432, and a recess 435 and a ramp 436 of strike plates 335. Glovebox actuator 440 may be implemented similarly as vehicle accessory actuator 170 in FIG. 1A and may be coupled electrically to and/or integrated with other elements of system 100, as described herein. In particular, glovebox actuator 440 may be implemented as a solenoid actuator configured to convert actuator control signals to linear motion (e.g., of latch bolts 345). Glovebox actuator 440 may be mounted to glovebox support frame 232 behind one or more of upper dashboard 240, transition dashboard 242, and lower dashboard 244 so as to be hidden from view and access without dismantling cockpit 200. Frame cover 432 may be mounted to an upper rear portion of glovebox support frame 232 and be configured to cover a wire harness for glovebox actuator 440, to provide a mounting space for temperature sensor 148 and/or other sensors, and/or to provide ducting for cool air routed to glovebox interior 236, for example.

Recess 435 of strike plate 335 may be configured to accept latch bolt 345 and prevent opening of glovebox assembly 230 unless latch bolt 345 is retracted substantially out of recess 435. In addition, recess 435 may have a depth configured to differentiate a position of latch bolt 345 when glovebox assembly 230 is properly closed and when glovebox assembly 230 is open. For example, the position of latch bolt 345 may be fully extended when glovebox assembly 230 is open, and the position of latch bolt 345 may be partially extended when glovebox assembly 230 is closed and latch bolt 345 is extended into recess 345 the full depth of recess 435. Such a partially extended latch position may be referred to as a closed latch position. Other positions of latch bolt 345, such as positions where latch bolt 345 is extended less than the closed latch position, may be referred to as intermediate latch positions. Such differentiation allows sensing of an open, an intermediate, and a closed state of glovebox assembly 230, as described herein. Ramp 436 of strike plate 335 may be configured to lever/force latch bolt 345 from a full extended open position to an intermediate latch position when closing glovebox assembly 230, to allow closing of glovebox assembly 230 and, once fully closed, engagement of latch bolt 345 with recess 435.

Figure 5:
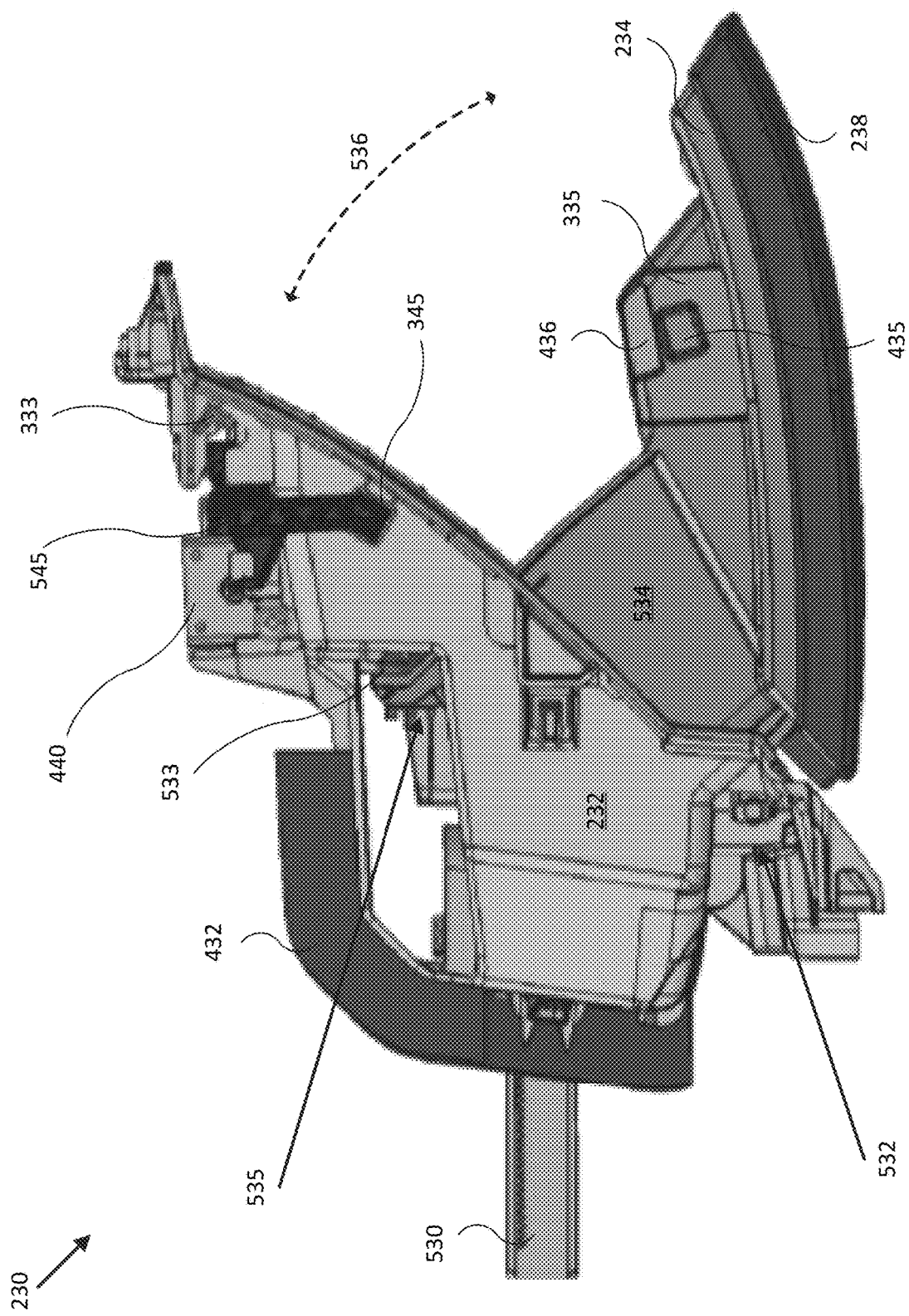
FIG. 5 illustrates a diagram of an actuated vehicle accessory in accordance with an embodiment of the disclosure.

FIG. 5 illustrates a diagram of actuated vehicle accessory/glovebox assembly 230 in accordance with an embodiment of the disclosure. In addition to the elements described with reference to FIGS. 2A-4, FIG. 5 shows a strut 530, a glovebox hinge 532 allowing glovebox assembly 230 to open and close along a pivot angle 536, an anchor stop 533 of an anchor assembly 535, and an anchor arm 534 of glovebox enclosure 234. Strut 530 may be configured to secure glovebox frame 232 and/or glovebox assembly 230 to a frame of vehicle 110, for example, and/or other structural elements of vehicle 110 and/or cockpit 200. In some embodiments, strut 530 may be adjustable so as to adjust a position of glovebox assembly 230 within cockpit 200. Glovebox hinge 532 may be coupled between glovebox support frame 232 and glovebox enclosure 234, for example, and be configured to limit movement of glovebox enclosure 234 substantially to pivot angle 536.

As shown, glovebox enclosure 234 includes anchor arm 534, which may provide structural linkage between glovebox enclosure 234 and glovebox hinge 532. Anchor arm 534 may also support anchor assembly 535 and anchor stop 533, which may combine to engage with glovebox support frame 232 to limit motion of glovebox enclosure 234 along pivot angle 536 when opened. Anchor stops 533 may be formed from flexible material configured to cushion opening of glovebox assembly 230 by flexibly contacting glovebox support frame 232, which acts to protect glovebox assembly 230 from damage when opening and to reduce the levels of sounds caused by such opening. In some embodiments, one or more of anchor stops 533 may be implemented with pressure sensors (e.g., other modules 180) configured to detect an open state of glovebox assembly 230 and/or to differentiate an open state from an intermediate and/or closed state of glovebox assembly 230. Latch extension 545 may form at least a part of a mechanical linkage between glovebox actuator 440 and latch bolt 345 to allow glovebox actuator 440 to retract latch bolts 345 out of recess 435, as described herein.

Figure 6:
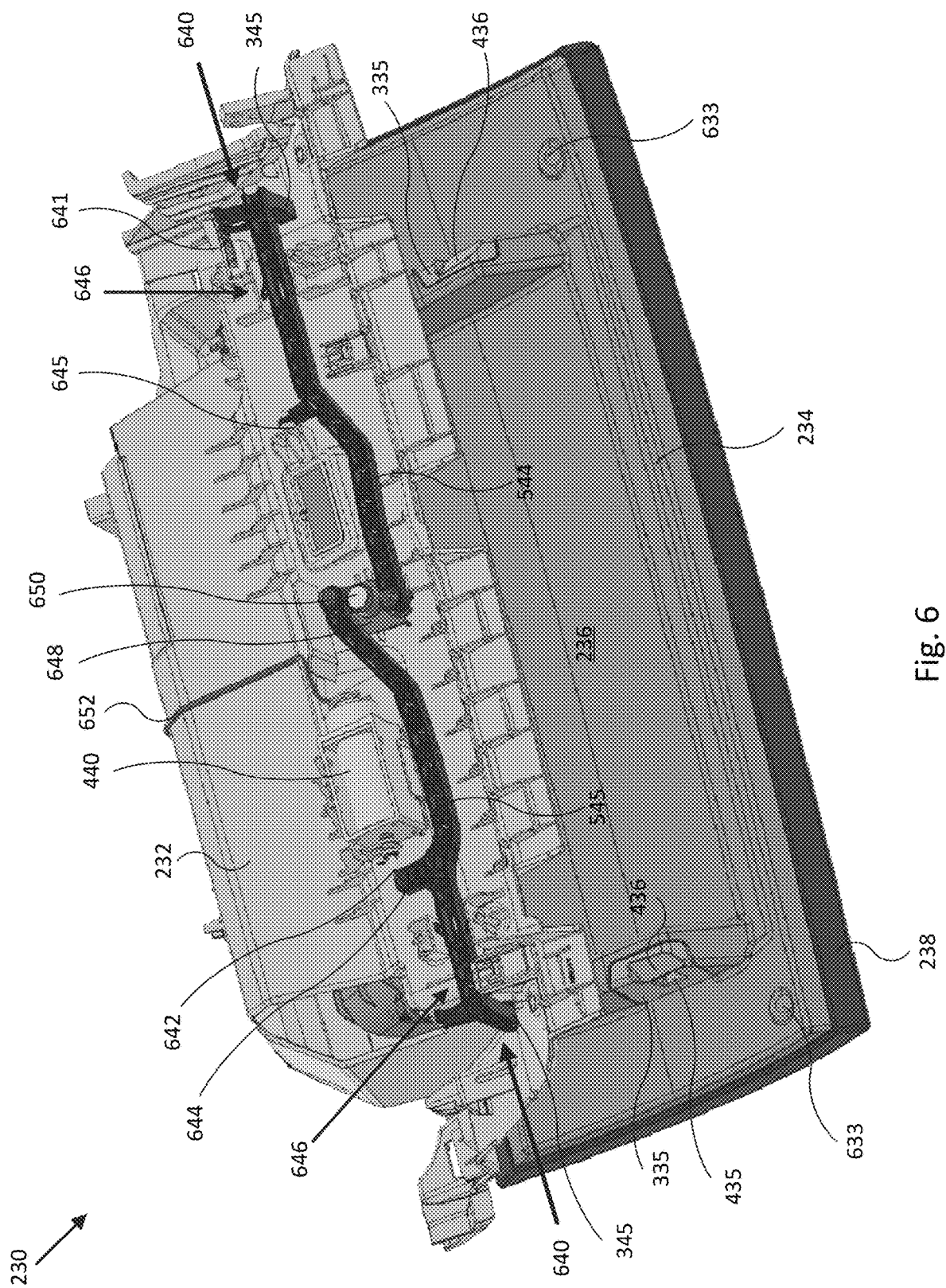
FIG. 6 illustrates a diagram of an actuated vehicle accessory in accordance with an embodiment of the disclosure.

FIG. 6 illustrates a diagram of actuated vehicle accessory/glovebox assembly 230 in accordance with an embodiment of the disclosure. In addition to the elements described with reference to FIGS. 2A-5, FIG. 6 shows a latch assembly 640, a wire harness 652 for glovebox actuator 440, and stop recesses 633. Wire harness 652 may include various wires and/or sockets/interfaces used to electrically couple glovebox actuator 440 and/or any associated sensors to the rest of system 100. Stop recesses 633 may be formed within glovebox enclosure 633 and be configured to accept or provide a stopping surface for frame stops 333. As shown in the embodiment illustrated by FIG. 6, latch assembly 640 is a double bolt latch assembly with two latch extensions 544 and 545 providing at least a portion of the mechanical linkage between glovebox actuator 440 and latch bolts 345. For example, latch assembly 640 may include an actuator linkage 642 configured to mechanically link an armature of glovebox actuator 440 to latch extension 545 (e.g., at a latch extension arm 644), and latch extension 545 may be mechanically linked to latch extension 544 through a knuckle plate 648 configured to rotate about a latch assembly pivot pin 650. Latch extensions 544 and 545 extend through and may be mechanically constrained by respective guide channels 646 formed in glovebox support frame 232 and mechanically link linear motion provided by glovebox actuator 440 to latch bolts 345. As shown in FIG. 6, latch bolts 345 may be formed integrally with latch extensions 544 and 545.

Also shown in FIG. 6 are a latch assembly return 641 and a latch assembly stop 645. Latch assembly return 641 may be implemented as a spring or other mechanical return mechanism configured to counteract linear motion provided by glovebox actuator 440 when glovebox actuator 440 is de-energized. For example, latch assembly return 641 may provide a return force to extend latch bolts 345 into recesses 435 when glovebox assembly 230 is properly closed. In some embodiments, glovebox actuator 440 may itself be configured to provide such return force and latch assembly return 641 may be omitted or used to provide a minimal return force once latch bolts 345 are engaged with recesses 435 and glovebox actuator 440 is de-energized. Latch assembly stop 645 may be formed from flexible material configured to cushion return of latch assembly 640 by flexibly contacting glovebox support frame 232 as shown, which acts to protect latch assembly 640 from damage when returning and to reduce the sound level of sounds caused by such returning (e.g., as caused by latch assembly return 641 and/or glovebox actuator 440).

Figure 7:
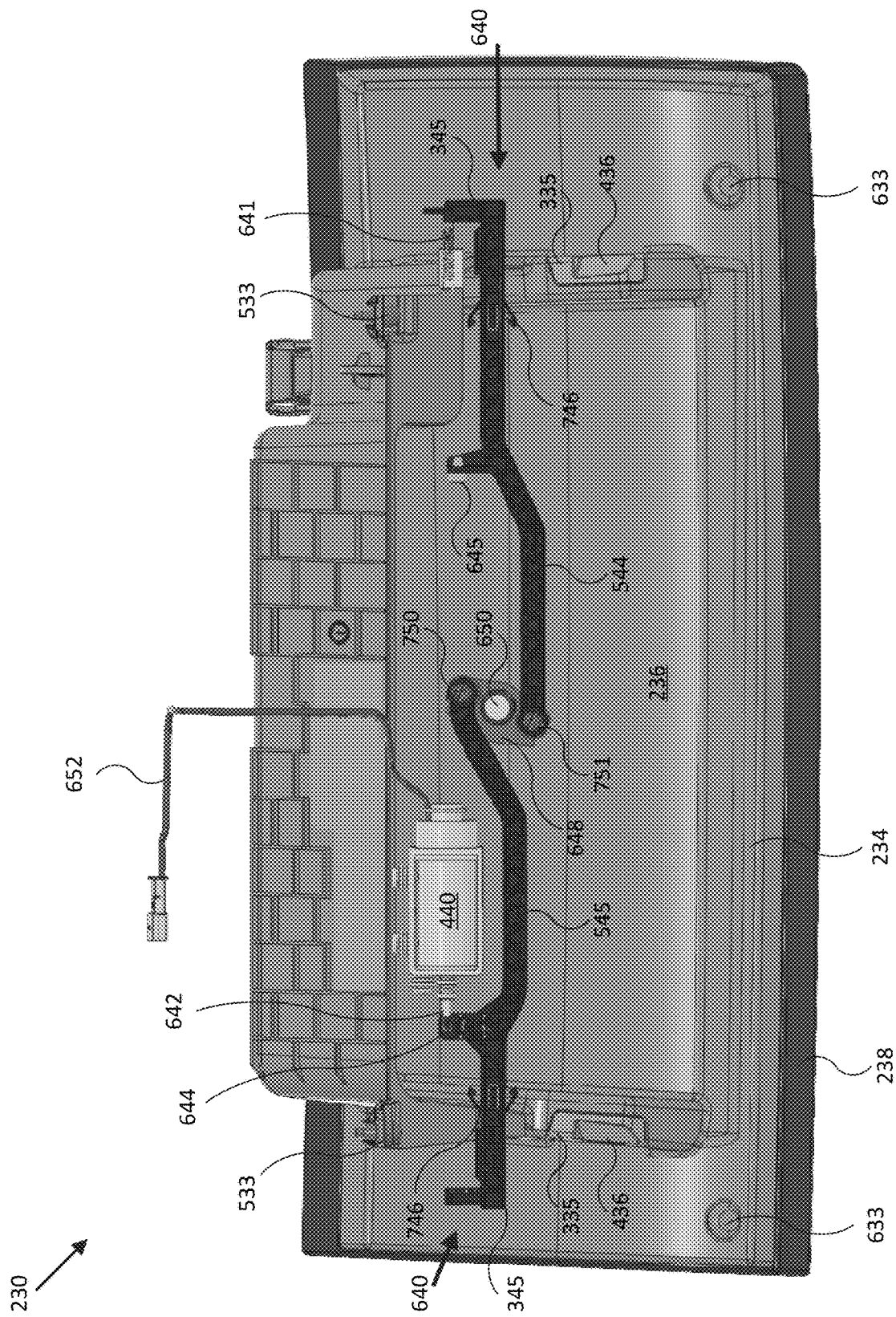
FIG. 7 illustrates a diagram of an actuated vehicle accessory in accordance with an embodiment of the disclosure.

FIG. 7 illustrates a diagram of actuated vehicle accessory/glovebox assembly 230 in accordance with an embodiment of the disclosure. In addition to the elements described with reference to FIGS. 2A-6, FIG. 7 shows channel guides 746 of link extensions 544 and 545 configured to position and/or constrain motion of link extensions 544 and 545 within guide channels 656 shown in FIG. 6, and linkages 750 and 751 coupling link extensions 544 and 545 to knuckle plate 648 to allow knuckle plate 648 to pivot about latch assembly pivot pin 650 and pivot relative to link extensions 544 and 545. Each of the elements of FIGS. 2A-7 may be made from metal, plastic, polymer, leather, and/or other materials typically used in the manufacture of cockpits, vehicle accessories, vehicle structures, gloveboxes, and/or other elements of a vehicle.

Figure 8:
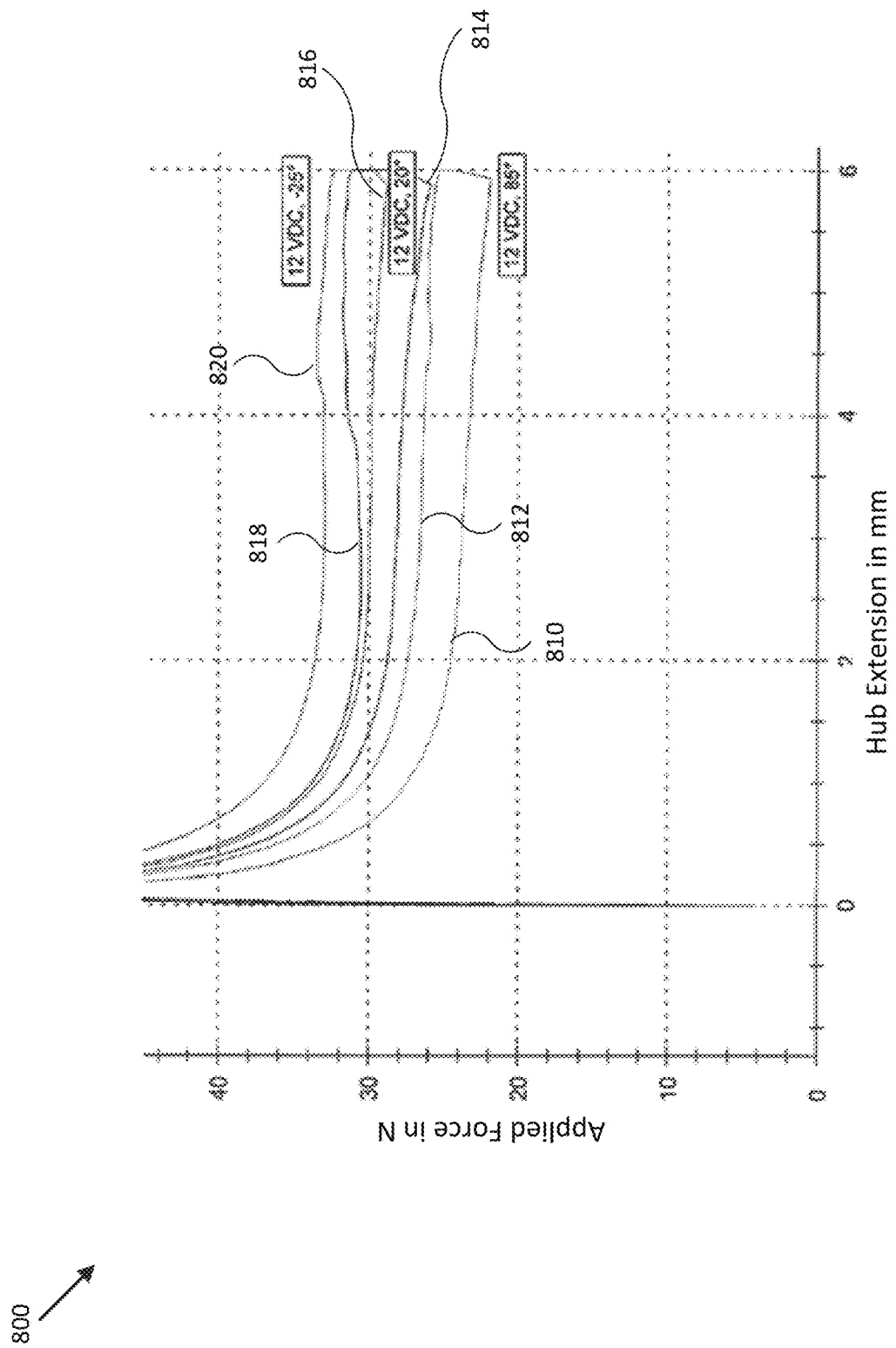
FIG. 8 illustrates a graph of applied force by a vehicle accessory actuator for various operating temperatures in accordance with an embodiment of the disclosure.

FIG. 8 illustrates a graph of applied force by vehicle accessory actuator 440 for various operating temperatures in accordance with an embodiment of the disclosure. As shown in FIG. 8, plot 810 illustrates the force produced by glovebox actuator 440 as a function of armature/hub extension at a typical comfortable temperature of approximately 85 degrees Fahrenheit. The temperatures for the remaining plots 812-820 are distributed between the approximately 85 degrees Fahrenheit and approximately negative 25 degrees Fahrenheit for plot 820. As can be seen from FIG. 8, the force applied by glovebox actuator 440 as it reaches its fullest extension (e.g., unlatching glovebox assembly 230) can range from 22 Newtons at 85 degrees to approximately 33 Newtons at negative 25 degrees, when provided a common 12 VDC supply voltage. This additional force generated at lower temperatures can produce a very loud and undesirable unlatching sound and/or cause damage to latch assembly 640 and/or other components of glovebox assembly 230. Alternatively, the reduced force generated at high temperatures can result in failure to retract latch bolts 345 and an inability to open glovebox assembly 230, particularly when glovebox actuator 440 is the only mechanism (e.g., other than dismantling cockpit 200) to access glovebox interior 236.

Embodiments of vehicle accessory control system 100 adjust the actuator control signal provided to glovebox actuator 440 to produce acceptable sound levels when actuating glovebox actuator 440 over a range of environmental conditions while ensuring reliable operation of glovebox actuator 440 and/or latch assembly 640 to open glovebox assembly 230. For example, controller 130 may be configured to adjust a duration, duty cycle, supply voltage, supply current, and/or supply power of an actuator control signal (e.g., to be provided to vehicle accessory/glovebox actuator 440) that is configured to adjust a force exerted by the vehicle accessory actuator, an actuator travel performed by the vehicle accessory actuator, a work performed by the vehicle accessory actuator, and/or a power output by the vehicle accessory actuator (e.g., a mechanical power output by the vehicle accessory actuator) so as to produce an actuation sound level approaching, at, or below a threshold actuation sound level, depending on the capabilities of the available adjustment mechanisms and/or the current environmental conditions. Such threshold actuation sound level (e.g., a sound level goal) may be set by a vehicle manufacturer and/or a user of vehicle 110. If vehicle accessory control system 100 detects a failure to actuate vehicle accessory actuator 440, system 100 may be configured to increase the force exerted, the actuator travel expected, the work performed, and/or the power output by vehicle accessory actuator 440, incrementally until successful operation of vehicle accessory actuator 440. Additionally, if vehicle accessory control system 100 detects an unexpected state of a vehicle accessory (e.g., an open state of glovebox assembly 230), system 100 may be configured to report such unexpected state to a user and/or set off an alarm (e.g., other modules 180).

Figure 9:
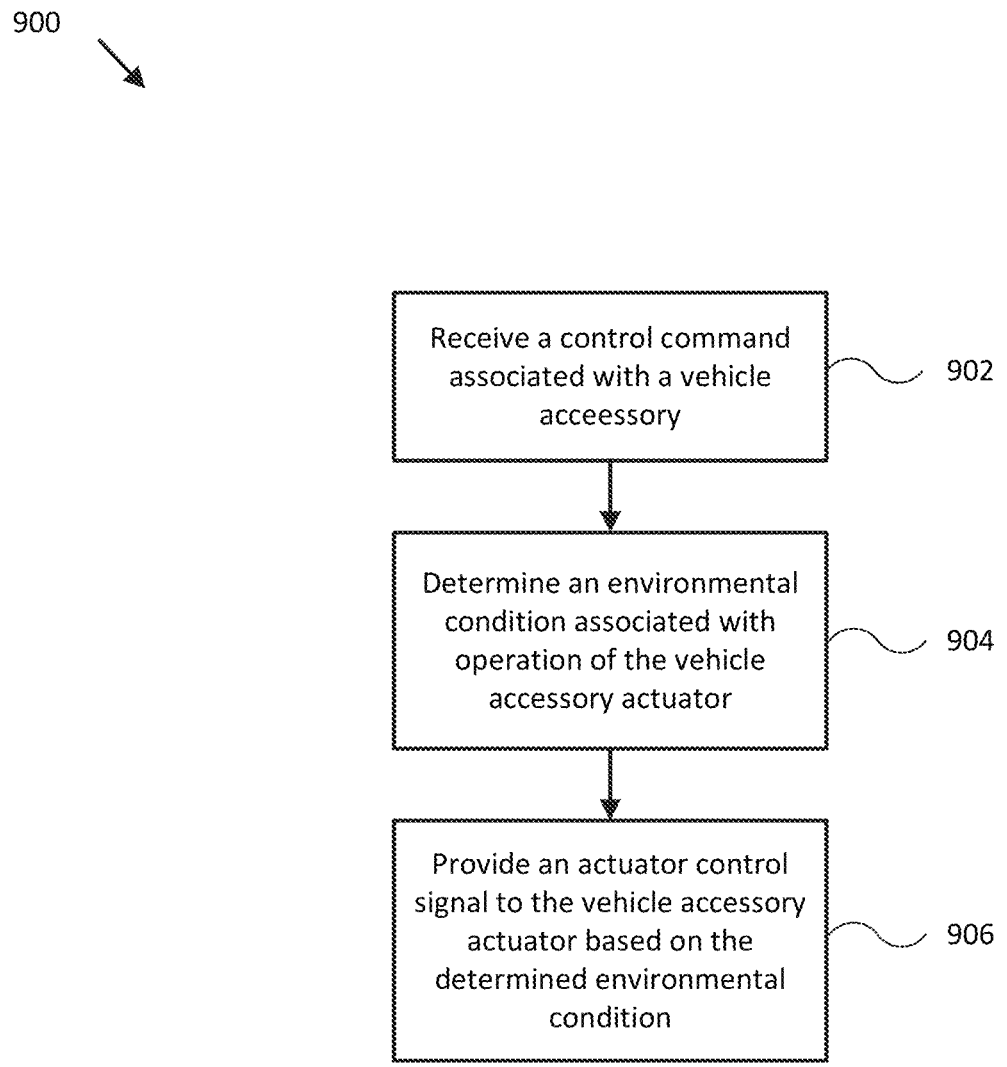
FIG. 9 illustrates a flow diagram of various operations to control operation of a vehicle accessory actuator in accordance with an embodiment of the disclosure.

FIG. 9 illustrates a flow diagram of process 900 to control operation of a vehicle accessory actuator in accordance with an embodiment of the disclosure. In some embodiments, the operations of FIG. 9 may be implemented as software instructions executed by one or more logic devices associated with corresponding electronic devices, sensors, and/or structures depicted in FIGS. 1A through 7. More generally, the operations of FIG. 9 may be implemented with any combination of software instructions and/or electronic hardware (e.g., inductors, capacitors, amplifiers, actuators, or other analog and/or digital components). It should be appreciated that any step, sub-step, sub-process, or block of process 900 may be performed in an order or arrangement different from the embodiments illustrated by FIG. 9. For example, in other embodiments, one or more blocks may be omitted from or added to the process. Furthermore, block inputs, block outputs, various sensor signals, sensor information, calibration parameters, and/or other operational parameters may be stored to one or more memories prior to moving to a following portion of a corresponding process. Although process 900 is described with reference to systems described in reference to FIGS. 1A-7, process 900 may be performed by other systems different from those systems and including a different selection of electronic devices, sensors, assemblies, actuators, vehicle accessories, vehicles, and/or vehicle attributes. At the initiation of process 900, various system parameters may be populated by prior execution of a process similar to process 900, for example, or may be initialized to zero and/or one or more values corresponding to typical, stored, and/or learned values derived from past operation of process 900, as described herein.

In block 902, a logic device receives a control command associated with a vehicle accessory. For example, controller 130 of system 100 may be configured to receive an unlatch command associated with glovebox 230 of FIGS. 2A-7. In some embodiments, controller 130 may be configured to render a control selector (e.g., an unlatch selector) on a touchscreen display of user interface 120 and receive a user selection of the control selector rendered on the touchscreen display as the control command. In other embodiments, controller 130 may be configured to use communication module 130 to establish a communication link (e.g., communication link 111 and/or 117 through network 114 and communication link 113 and/or communication link 115) with user device 112 and/or remote server 116 over local and/or wide area networks, for example, and receive the control command from user device 112 and/or remote server 116 over the local and/or wide area networks. In further embodiments, controller 130 may be configured to use a sound-monitoring subsystem to monitor spoken commands within a cockpit of the vehicle and detect a spoken control command within the spoken commands as the control command.

In block 904, a logic device determines an environmental condition associated with operation of a vehicle accessory actuator. For example, controller 130 may be configured to determine an operating temperature associated with glovebox actuator 440 of glovebox 230. In some embodiments, controller 130 may be configured to receive a measured temperature of cockpit 200 of vehicle 110, of vehicle accessory/glovebox assembly 230, and/or of vehicle accessory actuator 440 from a temperature sensor (e.g., temperature sensor 148) and determine the operating temperature associated with vehicle accessory actuator 440 as the measured temperature and/or based on the measured temperature (e.g., if the measured temperature is remote from vehicle accessory actuator 440, the measured temperature may be adjusted by a gain and/or bias factor, which may be derived from manufacturer calibration and/or system feedback, as described herein).

In other embodiments, controller 130 may be configured to use a sound-monitoring subsystem (e.g., other modules 180) to monitor sounds within cockpit 200 of vehicle 110 associated with actuation of the vehicle accessory actuator 440. Controller 130 may be configured to receive the sounds associated with actuation of vehicle accessory actuator 440 from the sound-monitoring subsystem and store them for feedback purposes and/or execution of block 906. Controller 130 may also be configured to use an electrical sensor (e.g., other modules 180) to monitor a resistance and/or a current draw of vehicle accessory actuator 440 and to estimate the operating temperature associated with vehicle accessory actuator 440 based, at least in part, on the measured resistance and/or current draw of vehicle accessory actuator 440. Controller 130 may also be configured to use an environmental sensor (e.g., other modules 180) configured to monitor an environmental condition associated with operation of vehicle accessory actuator 440 and store corresponding measured environmental data for execution of block 906.

In block 906, a logic device provides an actuator control signal to a vehicle accessory actuator based on an environmental condition associated with operation of the vehicle accessory actuator. For example, controller 130 may be configured to provide an actuator control signal to glovebox actuator 440 of glovebox 230 to unlatch glovebox 230, where at least one electrical characteristic of the actuator control signal is based, at least in part, on the operating temperature associated with glovebox actuator 440 determined in block 906. In some embodiments, the actuator control signal may alternatively and/or additionally be based on sounds associated with actuation of vehicle accessory actuator 440 received by a sound-monitoring subsystem and/or other measured environmental data received from an environmental sensor. In various embodiments, the electrical characteristics of the generated/provided actuator control signal may include a duration, duty cycle, supply voltage, supply current, and/or supply power of the actuator control signal that is configured to adjust a force exerted by vehicle accessory actuator 440, an actuator travel performed by vehicle accessory actuator 440, a work performed by vehicle accessory actuator 440, and/or a power output by vehicle accessory actuator 440, so as to actuate vehicle accessory actuator 440 to produce an actuation sound level approaching, at, or below a threshold actuation sound level, as described herein. In alternatively embodiments, such electrical characteristic of the actuator control signal may be adjusted to retry a failed actuation with a higher likelihood of success.

In various embodiments, controller 130 may be configured to use a vehicle accessory status sensor to monitor a vehicle accessory status of the vehicle accessory (e.g., glovebox assembly 230). Controller 130 may be configured to report an open status to a user of vehicle 110 if a received accessory status is an open status or an indeterminate status after an actuator control signal is provided to vehicle accessory actuator 440 (e.g., to indicate a successful opening, a failed opening, and/or a failed closing of glovebox assembly 230). The timing of such reporting and/or interstitial status changes may be used to differentiate between the d different possible circumstances. Controller 130 may also be configured to provide a longer duration, higher duty cycle, higher supply voltage, higher supply current, and/or higher supply power second actuator control signal to vehicle accessory actuator 440 if a received accessory status is a closed status or an indeterminate status after a first actuator control signal is provided to vehicle accessory actuator 440 (e.g., a failed opening of glovebox assembly 230). In related embodiments, controller 130 may be configured to report an open status to a user of vehicle HO if a received accessory status is an open status or an intermediate status prior to receiving the control command in block 902 (e.g., an unexpected opening of glovebox assembly 230 and/or possible act of theft). Such reports may be communicated to a display of user interface 120, to user device 112, and/or server 116. Controller 130 may additionally be configured to issue an alarm (e.g., honking a horn or otherwise energizing a sound transducer and/or lights elements of other modules 180 to indicate a possible safety issue or theft to the user or passersby).

It is contemplated that any one or combination of methods to control a vehicle accessory actuator may be performed according to one or more operating contexts of a control loop, for example, such as a startup, learning, running, and/or other type operating context. For example, process 900 may proceed back to block 902 and proceed through process 900 again to control a vehicle accessory with an actuated control signal with a further adjusted electrical characteristic, as in a control loop.

Embodiments of the present disclosure can thus provide efficient, reliable, and desirable vehicle accessory control. In particular, vehicle accessory control system 100 may be configured to adjust an actuator control signal to increase a force exerted by a vehicle accessory actuator to provide reliable operation of the actuated vehicle accessory, to decrease the exerted force to reduce a sound level associated with the actuation to or below a desirable threshold sound level, and/or to decrease the electrical power expended to operate the actuated vehicle accessory reliably to increase overall operational efficiency.

Where applicable, various embodiments provided by the present disclosure can be implemented using hardware, software, or combinations of hardware and software. Also where applicable, the various hardware components and/or software components set forth herein can be combined into composite components comprising software, hardware, and/or both without departing from the spirit of the present disclosure. Where applicable, the various hardware components and/or software components set forth herein can be separated into sub-components comprising software, hardware, or both without departing from the spirit of the present disclosure. In addition, where applicable, it is contemplated that software components can be implemented as hardware components, and vice-versa.

Software in accordance with the present disclosure, such as non-transitory instructions, program code, and/or data, can be stored on one or more non-transitory machine readable mediums. It is also contemplated that software identified herein can be implemented using one or more general purpose or specific purpose computers and/or computer systems, networked and/or otherwise. Where applicable, the ordering of various steps described herein can be changed, combined into composite steps, and/or separated into substeps to provide features described herein.

Embodiments described above illustrate but do not limit the invention. It should also be understood that numerous modifications and variations are possible in accordance with the principles of the invention. Accordingly, the scope of the invention is defined only by the following claims.

What is claimed is:

1. A system comprising:
   a vehicle accessory actuator configured to unlatch a vehicle accessory for a vehicle;
   a logic device coupled within the vehicle and configured to control operation of the vehicle accessory actuator, wherein the logic device is configured to:
   receive an unlatch command associated with the vehicle accessory;
   determine an operating temperature associated with the vehicle accessory actuator; and
   provide an actuator control signal to the vehicle accessory actuator to unlatch the vehicle accessory, wherein at least one electrical characteristic of the actuator control signal is based, at least in part, on the determined operating temperature associated with the vehicle accessory actuator; and
   a temperature sensor configured to monitor a measured temperature of a cockpit of the vehicle, of the vehicle accessory, and/or of the vehicle accessory actuator, and to provide the measured temperature to the logic device, wherein:
   the determining the operating temperature associated with the vehicle accessory actuator comprises receiving the measured temperature from the temperature sensor; and
   the operating temperature associated with the vehicle accessory actuator comprises the measured temperature of the cockpit of the vehicle, of the vehicle accessory, and/or of the vehicle accessory actuator.

2. The system of claim 1, further comprising a user interface including a touchscreen display disposed within a cockpit of the vehicle, wherein:
   the logic device is configured to render an unlatch selector on the touchscreen display; and
   the receiving the unlatch command associated with the vehicle accessory comprises receiving a user selection of the unlatch selector rendered on the touchscreen display.

3. The system of claim 1, further comprising a communication module configured to establish a communication link with a user device and/or a remote server over a local area network and/or a wide area network, wherein:
   the receiving the unlatch command associated with the vehicle accessory comprises receiving a remote unlatch command from the user device and/or the remote server over the local area network and/or the wide area network.

4. The system of claim 1, further comprising a sound-monitoring subsystem configured to monitor spoken commands within a cockpit of the vehicle and provide the spoken commands to the logic device, wherein:
the receiving the unlatch command associated with the vehicle accessory comprises detecting a spoken unlatch command within the spoken commands received from the sound-monitoring subsystem.

5. The system of claim 1, further comprising a sound-monitoring subsystem configured to monitor sounds within a cockpit of the vehicle associated with actuation of the vehicle accessory actuator and to provide the sounds to the logic device, wherein:
the logic device is configured to receive the sounds associated with actuation of the vehicle accessory actuator from the sound-monitoring subsystem; and
the at least one electrical characteristic of the actuator control signal is based on the determined operating temperature associated with the vehicle accessory actuator and the received sounds associated with actuation of the vehicle accessory actuator.

6. The system of claim 1, further comprising an electrical sensor configured to monitor a resistance and/or a current draw of the vehicle accessory actuator, and to provide the measured resistance and/or current draw to the logic device, wherein the determining the operating temperature associated with the vehicle accessory actuator further comprises:
receiving the measured resistance and/or current draw from the electrical sensor; and
estimating the operating temperature associated with the vehicle accessory actuator based, at least in part, on the measured resistance and/or current draw of the vehicle accessory actuator.

7. The system of claim 1, further comprising an environmental sensor configured to monitor an environmental condition associated with operation of the vehicle accessory actuator and to provide measured environmental data corresponding to the environmental condition to the logic device, wherein:
the logic device is configured to receive the measured environmental data from the environmental sensor; and
the at least one electrical characteristic of the actuator control signal is based on the determined operating temperature associated with the vehicle accessory actuator and the received measured environmental data.

8. The system of claim 1, wherein:
the at least one electrical characteristic of the actuator control signal comprises a duration, duty cycle, supply voltage, supply current, and/or supply power of the actuator control signal that is configured to adjust a force exerted by the vehicle accessory actuator, an actuator travel performed by the vehicle accessory actuator, a work performed by the vehicle accessory actuator, and/or a power output by the vehicle accessory actuator; and
the actuator control signal is configured to actuate the vehicle accessory actuator so as to produce an actuation sound level approaching, at, or below a threshold actuation sound level.

9. The system of claim 1, further comprising a vehicle accessory status sensor configured to monitor a vehicle accessory status of the vehicle accessory, wherein the vehicle accessory status comprises an open, a closed, or an indeterminate status corresponding to an open state of the vehicle accessory, the actuator control signal comprises a first actuator control signal, and the logic device is configured to receive the vehicle accessory status from the vehicle accessory status sensor and to perform one or more of:
report an open status to a user of the vehicle if the received accessory status is the open status or the indeterminate status after the first actuator control signal is provided to the vehicle accessory actuator; or
provide a longer duration, higher duty cycle, higher supply voltage, higher supply current, and/or higher supply power second actuator control signal to the vehicle accessory actuator if the received accessory status is the closed status or the indeterminate status after the first actuator control signal is provided to the vehicle accessory actuator.

10. The system of claim 1, further comprising a vehicle accessory status sensor configured to monitor a vehicle accessory status of the vehicle accessory, wherein the vehicle accessory status comprises an open, a closed, or an indeterminate status corresponding to an open state of the vehicle accessory, and wherein the logic device is configured to:
receive a vehicle accessory status comprising the open status or the indeterminate status prior to receiving the unlatch command; and
report an open status to a user of the vehicle.

11. The system of claim 1, wherein a force applied by the vehicle accessory actuator to unlatch the vehicle accessory is based on the determined operating temperature.

12. A method comprising:
receiving an unlatch command associated with a vehicle accessory for a vehicle;
determining an operating temperature associated with a vehicle accessory actuator configured to unlatch the vehicle accessory; and
providing an actuator control signal to the vehicle accessory actuator to unlatch the vehicle accessory, wherein at least one electrical characteristic of the actuator control signal is based, at least in part, on the determined operating temperature associated with the vehicle accessory actuator,
wherein determining the operating temperature associated with the vehicle accessory actuator comprises receiving a measured temperature of a cockpit of the vehicle, of the vehicle accessory, and/or of the vehicle accessory actuator from a temperature sensor,
and wherein the operating temperature associated with the vehicle accessory actuator comprises the measured temperature of the cockpit of the vehicle, of the vehicle accessory, and/or of the vehicle accessory actuator.

13. The method of claim 12, further comprising rendering an unlatch selector on a touchscreen display, wherein:
the receiving the unlatch command associated with the vehicle accessory comprises receiving a user selection of the unlatch selector rendered on the touchscreen display.

14. The method of claim 12, wherein:
the receiving the unlatch command associated with the vehicle accessory comprises receiving a remote unlatch command from a user device and/or a remote server over a local area network and/or a wide area network.

15. The method of claim 12, wherein:
the receiving the unlatch command associated with the vehicle accessory comprises detecting a spoken unlatch command within spoken commands received from a sound-monitoring subsystem.

16. The method of claim 12, further comprising:
receiving sounds associated with actuation of the vehicle accessory actuator from a sound-monitoring subsystem, wherein the at least one electrical characteristic of the actuator control signal is based on the determined operating temperature associated with the vehicle accessory actuator and the received sounds associated with actuation of the vehicle accessory actuator.

17. The method of claim 12, wherein the determining the operating temperature associated with the vehicle accessory actuator further comprises:
receiving a measured resistance and/or current draw from an electrical sensor configured to monitor a resistance and/or a current draw of the vehicle accessory actuator; and
estimating the operating temperature associated with the vehicle accessory actuator based, at least in part, on the measured resistance and/or current draw of the vehicle accessory actuator.

18. The method of claim 12, further comprising:
receiving measured environmental data from an environmental sensor configured to monitor an environmental condition associated with operation of the vehicle accessory actuator, wherein the at least one electrical characteristic of the actuator control signal is based on the determined operating temperature associated with the vehicle accessory actuator and the received measured environmental data.

19. The method of claim 12, wherein:
the at least one electrical characteristic of the actuator control signal comprises a duration, duty cycle, supply voltage, supply current, and/or supply power of the actuator control signal that is configured to adjust a force exerted by the vehicle accessory actuator, an actuator travel performed by the vehicle accessory actuator, a work performed by the vehicle accessory actuator, and/or a power output by the vehicle accessory actuator; and
the actuator control signal is configured to actuate the vehicle accessory actuator so as to produce an actuation sound level approaching, at, or below a threshold actuation sound level.

20. The method of claim 12, wherein the actuator control signal comprises a first actuator control signal, the method further comprising:
receiving a vehicle accessory status from a vehicle accessory status sensor, wherein the vehicle accessory status comprises an open, a closed, or an indeterminate status corresponding to an open state of the vehicle accessory; and:
reporting an open status to a user of the vehicle if the received accessory status is the open status or the indeterminate status after the first actuator control signal is provided to the vehicle accessory actuator; or
providing a longer duration, higher duty cycle, higher supply voltage, higher supply current, and/or higher supply power second actuator control signal to the vehicle accessory actuator if the received accessory status is the closed status or the indeterminate status after the first actuator control signal is provided to the vehicle accessory actuator.

21. The method of claim 12, further comprising:
receiving a vehicle accessory status from a vehicle accessory status sensor prior to receiving the unlatch command, wherein the vehicle accessory status comprises an open status or an indeterminate status corresponding to an open state of the vehicle accessory; and
reporting an open status to a user of the vehicle.

22. The method of claim 12, wherein a force applied by the vehicle accessory actuator to unlatch the vehicle accessory is based on the determined operating temperature.

* * * * *